(12) United States Patent
Oprescu

(10) Patent No.: US 6,359,479 B1
(45) Date of Patent: Mar. 19, 2002

(54) SYNCHRONIZING DATA TRANSFERS BETWEEN TWO DISTINCT CLOCK DOMAINS

(75) Inventor: Florin Alexandru Oprescu, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 09/179,277

(22) Filed: Oct. 26, 1998

Related U.S. Application Data

(63) Continuation-in-part of application No. 09/129,100, filed on Aug. 4, 1998, now abandoned.

(51) Int. Cl.[7] ................................................. H03L 7/00
(52) U.S. Cl. ........................ 327/141; 327/144; 375/362
(58) Field of Search .................................. 327/141, 144, 327/145, 154, 161; 375/355, 362, 364

(56) References Cited

U.S. PATENT DOCUMENTS

| | | | |
|---|---|---|---|
| 5,185,768 A | * 2/1993 | Ferraiolo et al. | ............ 375/119 |
| 5,256,912 A | * 10/1993 | Rios | ............................ 307/269 |
| 5,834,956 A | * 11/1998 | Pathikonda et al. | ......... 327/116 |
| 5,999,023 A | * 12/1999 | Kim | ............................ 327/144 |

FOREIGN PATENT DOCUMENTS

| | | |
|---|---|---|
| EP | 0 678 990 A2 | 10/1995 |
| EP | 0798 630 A1 | 10/1997 |

* cited by examiner

Primary Examiner—Timothy P. Callahan
Assistant Examiner—Linh Nguyen

(57) ABSTRACT

A method and apparatus for transferring data between a driver and a receiver operating in two distinct clock domains under the control of first and distinct second clock signals. The method includes transferring data out from the driver at an active edge of the first clock signal. A delay after the active edge of the first clock signal that data may be unstable is determined. The reading of data received from the driver at the receiver is delayed until an active edge of the first clock signal is received that is generated after the delay has expired.

17 Claims, 2 Drawing Sheets

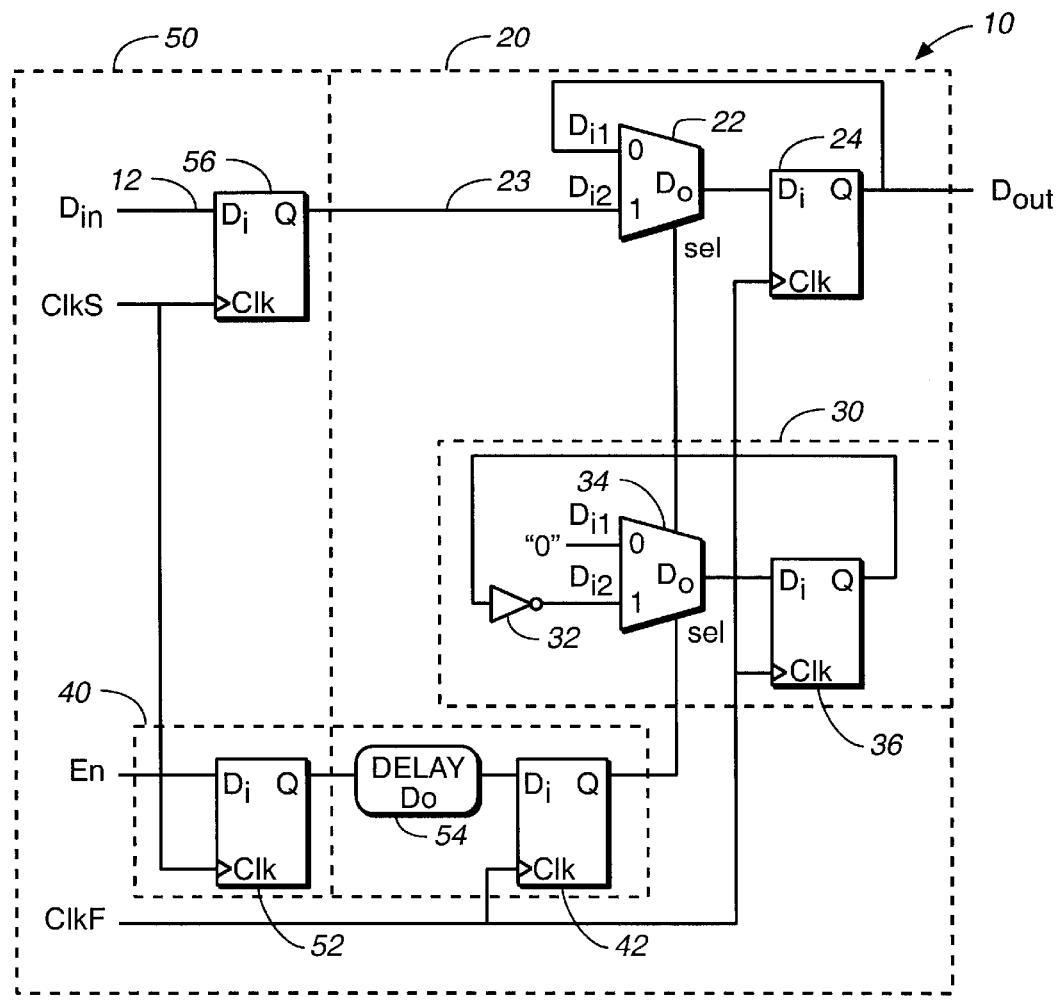
FIG._1a
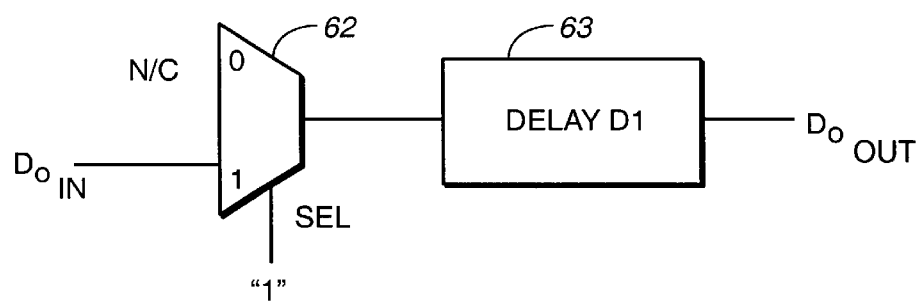
FIG._1b

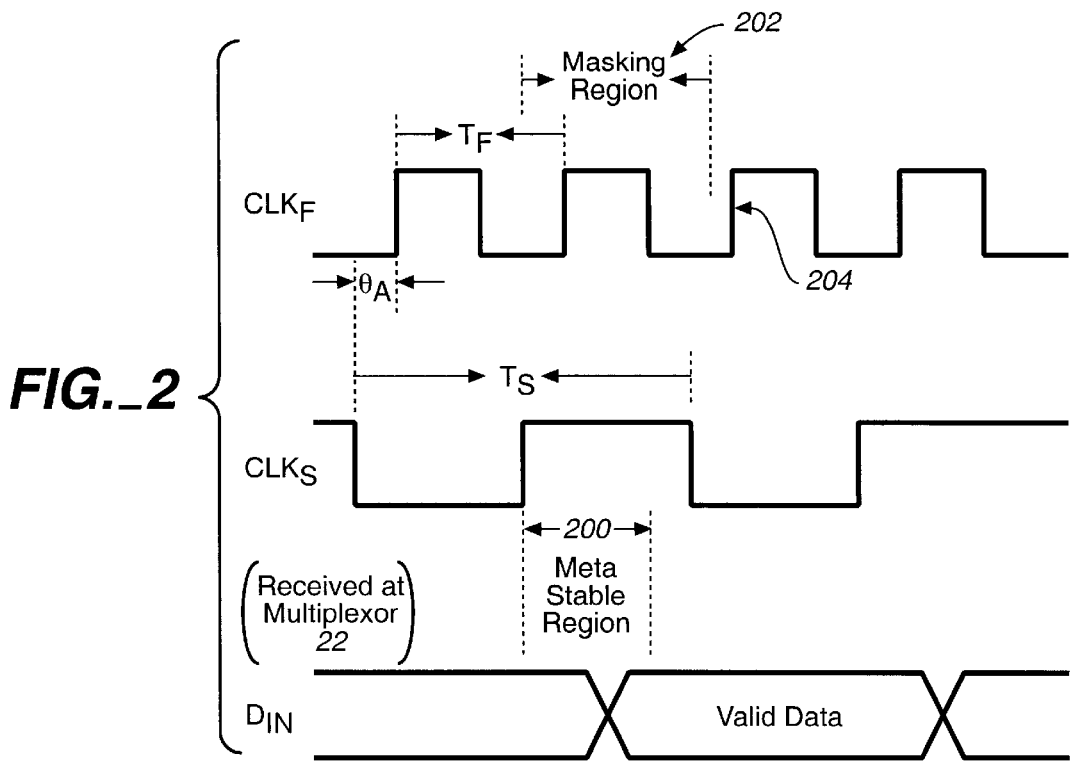
FIG._2
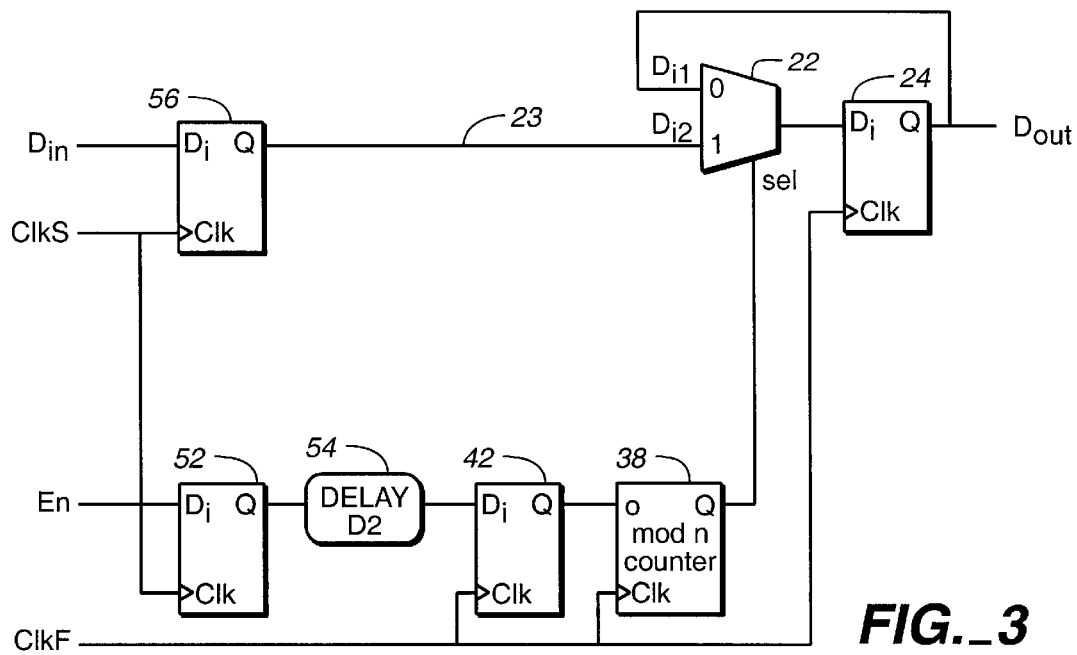
FIG._3

SYNCHRONIZING DATA TRANSFERS BETWEEN TWO DISTINCT CLOCK DOMAINS

The present invention is a continuation in part of patent application Ser. No. 09/129,100 filed Aug. 4, 1998, is now abandoned.

BACKGROUND

The present invention relates generally to electronic circuits, and more particularly to methods and apparatus for transferring data between two distinct clock domains in a digital circuit.

Synchronization of electrical devices in a digital electronic circuit is typically performed using a clock signal. A central clock source provides as an output the clock signal. The clock signal in turn may be coupled to each device in the electronic circuit. Flip flops, latches and the like are commonly available with clock inputs for receiving a clock signal. The operation of each device may be triggered based on the clock signal.

Electrical circuit applications often require the transfer of data from one circuit to another. The transferring circuit, often referred to as a driver, transfers data along a data link to a receiving circuit, often referred to as a receiver.

The transfer of data between circuits in an electrical device, often requires some form of synchronization. Synchronization may be achieved by operating devices in each circuit on the same clock signal, or by providing clocking signals along with data as the data is transferred between the respective circuits.

In certain digital circuit applications, two circuits within a device may be required to be operated in distinct clock domains. That is, each circuit may make use of a distinct clock signal to trigger operations in the respective circuit. For example, data may be received at an input gate (receiver) on one circuit board controlled by a first clock signal $CLK_1$ from an output gate (transmitter) on second circuit board controlled by a second distinct clock signal $CLK_2$.

Data may be required to be transferred between the two circuits, where each operates in a distinct clock domain. Where the two clock signals have different frequencies, data transfer is problematic. Even if the two clock signals are operated at the same frequency (the two circuits are synchronous), the arbitrary phase relationship between the signals may result in metastability issues. A metastability failure may occur at a receiver, operating in a first clock domain, due to the difference in phase relationship between the received data, passed from a driver operating in a distinct second clock domain, and the local clock.

SUMMARY OF THE INVENTION

In general, in one aspect, the invention provides a method for transferring data between a driver and a receiver operating in two distinct clock domains under the control of first and distinct second clock signals. The method includes transferring data out from the driver at an active edge of the first clock signal. A delay after the active edge of the first clock signal that data may be unstable is determined. The reading of data received from the driver at the receiver is delayed until an active edge of the first clock signal is received that is generated after the delay has expired.

Aspects of the invention include numerous features. The frequency of the second clock signal can be an integer multiple of the frequency of the first clock signal. The reading of data can include determining a best edge that is farthest from a metastable region. The best edge can be selected as an edge that is closest to a center of a valid data region.

In another aspect, the invention provides a data interface for transferring data between circuits operating in two distinct clock domains and includes a driver including a latch having an input port and an output port operable to transfer an input signal received at the input port to the output port on an active edge of a clock signal, receiver including a second latch having an input port and an output port operable to transfer the input signal received at the input port to the output port on an active edge of the second clock signal. The frequency of the second clock signal is an integer multiple of the frequency of the first clock signal. The receiver includes a delay circuit triggered by the active edge of the first clock signal and operable to produce a delayed signal active a predetermined time after the second clock signal is active, and a selector coupled to the delay circuit for selecting an appropriate edge of the second clock signal that is active after receipt of the delayed signal. The selector is coupled to the second latch and operable to trigger the read of data from the driver on the appropriate edge.

In another aspect, the invention provides a data interface for transferring data between circuits operating in two distinct clock domains under the control of a first and distinct second clock signals where the frequency of the second clock signal is an integer multiple of the frequency of the first clock signal. The data interface includes a driver including a latch having an input port and an output port operable to transfer an input signal received at the input port to the output port on an active edge of the second clock signal. The interface includes a receiver including a second latch having an input port and an output port operable to transfer the input signal received at the input port to the output port on an active edge of the first clock signal. The receiver includes a multiplexor, a delay element and a synchronization circuit. The multiplexor includes an input coupled to the output port of the latch in the driver, an output coupled to the input port of the second latch and an enable port for enabling the transfer of data through the multiplexor. The delay circuit is triggered by the active edge of the second clock signal and operable to produce a delay signal active a predetermined time after the second clock signal is active. The synchronization circuit is operable to receive the delay signal and generate an enable signal that is coupled to the enable port of the multiplexor.

Among the advantages of the invention are one or more of the following. Successful synchronous data transfers between two circuits operating in distinct clock domains is achieved by adjusting the data arrival time as a function of the phase relationship between the two distinct clocks. The adjustment is optimally performed in order to accommodate further variations in the phase relationship between the two clock signals. The present invention has applicability to data transfers between two distinct clock domains across circuit boards, integrated circuits or within an integrated circuit. Successful synchronous data transfers may be achieved without requiring the derivation of the receiving domain clock from the received data. Data signals may be received at a first circuit controlled by a first clock signal in a first clock domain from a second circuit controlled by a second distinct clock signal in a second clock domain with a minimum probability of a metastable failure.

Other advantages and features will be apparent from the following description and claims.

BRIEF DESCRIPTION OF THE DRAWINGS

FIG. 1a is a schematic diagram of a data transfer circuit according to the invention.

FIG. 1b is a schematic diagram of a delay element according to the invention.

FIG. 2 is a timing diagram associated with the circuit of FIG. 1a.

FIG. 3 is a schematic diagram of a data transfer circuit according to an alternative implementation of the invention.

DETAILED DESCRIPTION

Referring to FIG. 1a, a data interface circuit 10 for transferring a data signal 12 between circuit devices operating in two distinct clock domains is shown. Data transfer circuit 10 includes a receiver circuit 20 in a first clock domain controlled by a first clock signal $CLK_F$ and a driver circuit 50 in a second clock domain controlled by a second distinct clock signal $CLK_S$.

The frequency of the first clock signal $CLK_F$ is $FREQ_F$, while the frequency of the second clock signal is $FREQ_S$. The frequency $FREQ_F$ of the first clock signal $CLK_F$ is an integer multiple of the frequency $FREQ_S$ of the second clock signal $CLK_S$ such that $FREQ_F=N*FREQ_S$ where $N>=2$. Data interface circuit 10 shown in FIG. 1a is an implementation where N=2. The phase relationship between the first clock signal $CLK_F$ and the second clock signal $CLK_S$ may be arbitrary but must be maintained relatively constant during the operation of the data interface.

Receiver circuit 20 includes multiplexor 22, output latch 24, divide-by-two circuit 30, first synchronization latch 42 and delay element 54. Multiplexor 22 can be a two-to-one multiplexor and includes first and second inputs $Di_1$ and $Di_2$, select input line SEL as well as multiplexed output Do. Output latch 24 can be a D-style flip-flop and includes data input $D_i$, clock input CLK and data output $Q_o$. The "0" input $Di_1$ of multiplexor 22 is coupled to the output $Q_o$ of output latch 24, while the output $D_o$ of multiplexor 22 is coupled to the input $D_i$ of output latch 24.

Divide-by-two circuit 30 includes invertor 32, multiplexor 34 and latch 36. Multiplexor 34 can be a two-to-one multiplexor and includes first and second inputs $Di_1$ and $Di_2$, select input line SEL as well as multiplexed output Do. Latch 36 can be a D-style flip-flop and includes data input $D_i$, clock input CLK and data output $Q_o$. The input to invertor 32 is coupled to the output $Q_o$ of latch 36 as well as to the select signal line SEL of multiplexor 22. The output of invertor 32 is coupled to the "1" input $Di_2$ of multiplexor 34 while the "0" input $Di_1$ of multiplexor 34 is tied to a logical low "0" signal level. The output $D_o$ of multiplexor 34 is coupled to the input $D_i$ of latch 36. The select signal line SEL of multiplexor 34 is coupled to the output $Q_o$ of first synchronization latch 42. Finally, the clock inputs CLK of each of output latch 24, latch 36 and first synchronization latch 42 are coupled to receive the first clock signal $CLK_F$.

First synchronization latch 42 forms part of synchronization circuit 40 which spans data interface circuit 10 and includes devices in each of driver circuit 50 and receiver circuit 20. First synchronization latch 42 can be a D-style flip-flop and includes data input $D_i$, clock input CLK and data output $Q_o$.

Delay element 54 may be fixed or adjustable. The dely time is set based on the propagation delay through multiplexor 22 plus a constant. The delay period is discussed in greater detail below.

Driver circuit 50 includes input latch 56 and second synchronization latch 52. Input latch 56 and second synchronization latch 52 can be D-style flip-flops and include data input $D_i$, clock input CLK and data output $D_o$. Data signal 12 is coupled to the data input $D_i$ of input latch 56, whose output $Q_o$ is in turn coupled to the second input $Di_2$ of multiplexor 22 via link 23. Link 23 may be a single bit wide, or alternatively may be sized to include the output from second synchronization latch 52 which is coupled across the interface to the input of delay element 54. The input of second synchronization latch 52 is coupled to enable signal $E_n$. The operation of the enable signal $E_n$ is discussed further below. The output $Q_o$ of second synchronization latch 52 is coupled to the input of delay element 54. Finally, the clock inputs CLK of each of input latch 56 and second synchronization latch 52 are coupled to the second clock signal $CLK_S$.

The period of the first clock domain controlled by $CLK_F$ is $T_F$ and the period of the second clock domain controlled by $CLK_S$ is $T_S$. The relationship of the period of the first clock domain to the period of the second clock domain is given by $T_S=T_F*N$. For an implementation where N=2, the relationship is shown in FIG. 2. Data transfers between the second clock domain and the first clock domain are characterized by a metastable region 200 based on the arbitrary phase relationship $\theta_A$ between the first clock domain and the second clock domain. The present invention provides a simple mechanism for selecting a best edge of the first clock signal $CLK_F$ to avoid triggering data transfers during the time period associated with the metastable region (FIG. 1).

In order to guarantee correct operation of the receiver it is desirable to locate an active edge of the receiver clock ($CLK_F$) that is in the center of the valid data region. In the implementation shown in FIG. 2, there are two clock edges of $CLK_F$ for every edge of $CLK_S$. One edge of $CLK_F$ can be selected as the active edge while the second can be unused. The present invention decides which of the edges is active based on the phase relationship of the clocks and the propagation delay through multiplexor 22. The edge that provides optimum performance given any arbitrary initial phase relationship is selected.

Edges are selected by triggering the data read in the receiver after a predetermined delay defined by delay element 54. A masking region 202 is defined with respect to the second clock signal based on the set up time and hold time of gates in the data interface. Thereafter, a particular edge (for example edge 204) of the first clock signal that is not in the masked region is used to clock data into the first clock domain.

Referring again to FIG. 1a, for optimum performance (i.e., maximum tolerance to subsequent changes in the phase relationship between $CLK_S$ and $CLK_F$) the delay D0 introduced by delay element 54 can be calculated as follows:

$$D0=(1+(N)\bmod 2)*T_S/(2*N)+Tkq_{56}+T1_{22}+Tsu_{24}-Tkq_{52}-Tsu_{42},$$

where $Tkq_{56}$ is the typical clock to output propagation delay for input latch 56;

$T1_{22}$ is the typical propagation delay from input "1" to output for multiplexor 22;

$Tsu_{24}$ is the typical data setup delay with respect to clock for output latch 24;

$Tkq_{52}$ is the typical clock to output propagation delay for second synchronization latch 56; and $Tsu_{42}$ is the typical data setup delay with respect to clock for first synchronization latch 42.

In one implementation, input latch 56 and second synchronization latch 52 are identical D-style flip flops such that $Tkq_{56}=Tkq_{52}$. Similarly, output latch 24 and first synchronization latch 42 are identical D-style flip flops such that $Tsu_{56}=Tsu_{52}$. In addition, delay element 54 may be formed from the combination of a two-to-one multiplexor 62 and a delay circuit 63 as is shown in FIG. 1b. Two-to-one multiplexor 62 has its SEL signal line permanently asserted and the "1" input coupled to the output $D_o$ of second synchronization latch 52. The output of two-to-one multiplexor 62 is in turn coupled to delay circuit 63 having a typical delay of D1. The output of delay element 63 is coupled to the data input $D_i$ of first synchronization latch 42. The delay D0 through delay element 54 may then be determined by:

$$D0=D1+T1_{62};$$

where $T1_{62}$ is the typical propagation delay from input "1" to output for multiplexor 62; and where D1 is the delay through delay element 63.

Using the formulas above, the delay D1 may be described by:

$$D1=(1+(N)\bmod 2)*T_S/(2*N)+Tkq_{56}+T1_{22}Tsu_{24}-Tkq_{52}-Tsu_{42}-T1_{62}.$$

Two-to one multiplexor 62 may be constructed identically to multiplexor 22 such that $T1_{22}=T1_{62}$. The delay D1 becomes:

$$D1=(1+(N)\bmod 2)*T_S/(2*N),$$

where for N=odd integer, $D1=T_S/N$, and for N=even integer, $D1=T_S/2*N$.

Delay D1 is optimally set to be ¼ of the period of the second clock signal $CLK_S$ when N=2.

All of the formulas above have been described for the general case of $T_S=N*T_F$, while the circuit shown in FIG. 1 describes the specific case of $T_S=2*T_F$. Those ordinarily skilled will recognize that the invention has applicability to other cases and, as such, the particular description shown in FIGS. 1a and 1b should be viewed as exemplary and should not be construed as limiting the scope of the invention.

Operation

Data signal 12 is received at the data input $D_i$ of input latch 56. Data signal 12 is latched by input latch 56 on the active edge of the second clock signal $CLK_S$. The output $Q_o$ of input latch 56 is transferred to the input $D_i$ of output latch 24 on the active edge of the first clock signal $CLK_F$ under the control of multiplexor 22. When the SEL signal line of multiplexor 22 is de-asserted, the output $Q_o$ of output latch 24 is coupled to its own input $D_i$ through the first input $Di_1$ (the "0" input) of multiplexor 22. The output $D_o$ of output latch 24 therefore does not change output state on the active edge of clock $CLK_F$. When the SEL signal line of multiplexor 22 is asserted, the input $D_i$ of output latch 24 is coupled to output $D_0$ of input latch 56 through the second input $Di_2$ (the "1" input) of multiplexor 22. One data bit present at the output $D_o$ of input latch 56 is latched into output latch 24 on the active edge of first clock signal $CLK_F$.

The control signal for multiplexor 22 (SEL) is created by divide-by-two circuit 30. When the selector signal line SEL for multiplexor 34 is in the de-asserted state, the divide-by-two circuit 30 is disabled thus connecting, in a continuous fashion, a logical "0" signal to the input $D_i$ of latch 36 through the first input $Di_1$("0" input) of multiplexor 34. When the select signal line SEL is held at a logic "1", the divide-by-two circuit 30 is enabled connecting the input $D_i$ of latch 36 to its own output $D_0$ through invertor 32. Accordingly, latch 36 changes state on every active edge of the first clock signal $CLK_F$.

First and second synchronization latches 42 and 52 respectively together with delay element 54 form an initial synchronization mechanism. The entire interface is enabled by enable signal $E_n$. When enabled (logic "1") enable signal $E_n$ is latched by second synchronization latch 52 on the active edge of the second clock signal $CLK_S$. The output of second synchronization latch 52 is transferred through delay element 54 to the input $D_i$ of first synchronization latch 42 where it is latched by the active edge of the first clock signal $CLK_F$. The output $Q_o$ of first synchronization latch 42 enables divide-by-two circuit 30 which in turn generates the control signal (SEL) for multiplexor 22 to latch data signal 12 into output latch 24.

Alternative Implementations

Mod n Counter

Alternatively, divide-by-two circuit 30 may be of the form of a mod n counter 38 as is shown in FIG. 3. Mod n counter 38 includes input $D_i$, output $Q_o$ and a clock input CLK. Input $O_i$ of mod n counter 38 is coupled to output $Q_0$ of first synchronization latch 42. Output $Q_0$ of mod n counter 38 is coupled to the select signal line SEL of multiplexor 22. The clock input CLK is coupled to the first clock signal $CLK_F$. The remainder of the circuit is connected as described above. Mod n counter 38 can be constructed from a standard modulo n counter operating on the active edge of first clock signal $CLK_F$ and implementing an "n-state" state machine where the current state identifier s (where s ranges from zero to n−1, s=0,1 . . . n−1) corresponds with the current counter value. When the input O of mod n counter 38 is de-asserted (logic "0"), the counter remains in state "0" independent of the first clock signal $CLK_F$. While the input O is asserted (logic "1"), the counter advances exactly one state for every active edge of the first clock signal $CLK_F$. If the current counter state is I (where I ranges from zero to n−2, I=0,1 . . . n−2), the next active edge of first clock signal $CLK_F$ causes a transition to the state of I+1. If the current counter state is n−1, the next active edge of the first clock signal $CLK_F$ causes a transition to state "0".

The output $D_0$ of mod n counter 38 is asserted (logic "1") if and only if the input O to mod n counter 38 is asserted and the current counter state is $S_{on}$, where For N=2, $S_{on}=1$;

For N=even integer greater than 2, $S_{on}=(N/2)-2$

For N=odd integer, $S_{on}=(N-1)/2-1$.

M-bit Wide Data Paths

FIGS. 1 and 3 show the $D_{in}$ to $D_{out}$ data path as one bit wide. The architecture can be extended to include an M-bit wide data path that includes an m-bit wide input register, m-bit wide multiplexor and m-bit wide output register replacing input latch 56, multiplexor 22 and output latch 24 respectively.

Deserialized Data Transfers

The data interface described above provides a solution to data transfers between distinct clock domains when the frequency of the first clock signal is an integer multiple of the frequency of the second clock signal ($FREQ_F=N*FREQ_S$). With the addition of a deserializer circuit in driver circuit 50 controlled by second clock signal $CLK_S$, the architecture can be extended to be useful in applications where the frequency $FREQ_S$ of the second clock signal $CLK_S$ is any positive integer multiple p of the frequency $FREQ_F$ of the first clock signal $CLK_F$ ($FREQ_S=p*FREQ_F$).

A deserializer circuit (not shown) may be added into driver circuit 50 such that initial m-bit wide input data stream $D_{in}$ arriving on every active edge of second clock signal $CLK_S$ is transferred into a 2*p*m-bit wide data stream arriving on every active edge of a deserialized clock signal $CLK_{DS}$. The implementation of such a deserializer circuit is well known in the art. For such a deserializer as described above, the resultant frequency $FREQ_{DS}$ of the deserialized clock signal $CLK_{DS}$ is set such that $FREQ_{DS}= FREQ_S/2*p$. Because the frequency $FREQ_S$ is equal to $p*FREQ_f$, $FREQ_{DS}$ may be described by $$FREQ_{DS}=p*FREQ_f/(2*p)=FREQ_f/2.$$

This architecture is applicable for transferring data through the deserializer circuit controlled by the deserializer clock domain to the receiver circuit controlled in the first clock domain.

Selecting a "Best" Edge

As described above, the selection of an edge to trigger data reads in the first clock domain (receiver circuit) is delayed by a time period defined by delay element 54. The selection of the edge may be optimized when the value of N, the multiplier defining the relationship between the frequencies of the first and second clock signals, is greater than 2. The delay can be set to select an edge that is closest to the center of the valid data period. A masking region may be defined that extends from a predefined time period after the start of a last valid data period until a predefined time after the beginning of a current valid data period.

The present invention has been described in terms of specific embodiments, which are illustrative of the invention and not to be construed as limiting. Other embodiments are within the scope of the following claims.

What is claimed is:

1. A method for transferring data between a driver and a receiver operating in two distinct clock domains under the control of first and distinct second clock signals, the method comprising the following steps:

transferring data out from the driver at an active edge of a first clock signal;

transferring an enable signal from the driver to the receiver at the active edge of the first clock signal;

delaying the enable signal a predetermined delay amount; and reading the data received from the driver at the receiver on an active edge of the second clock signal that arrives after the delayed enable signal is receive.

2. The method of claim 1 where the frequency of the second clock signal is an integer multiple of the frequency of the first clock signal.

3. The method of claim 1 wherein the edge used to read the data at the receiver is a best edge of the second clock signal that is farthest from a time period corresponding to a metastable region in a data transmission between the driver and receiver that begins at the active edge of the first clock signal and yet still during a time period corresponding to a valid data region in the data transmission.

4. The method of claim 3 where the best edge is an edge that corresponds to a center of the valid data region in the data transmission.

5. A data interface for transferring data between circuits operating in two distinct clock domains comprising:

a driver including a latch having an input port and an output port operable to transfer a signal received at the input port to the output port on an active edge of a first clock signal;

a receiver including a second latch having an input port and an output port operable to transfer a signal received at the input port to the output port on an active edge of a second clock signal, where the frequency of the second clock signal is an integer multiple of the frequency of the first clock signal, and a delay circuit triggered by the active edge of the first clock signal and operable to produce a delayed signal having an active edge a predetermined time after the active edge of the first clock signal, the selector coupled to the second latch and operable to trigger the transfer of the signal from the input port of the second latch to the output port of the second latch on an appropriate edge of the second clock signal, where the appropriate edge is an edge of the second clock signal that arrives after the predetermined time after the active edge of the first clock signal; and means for coupling the output port of the latch to the input port of the second latch.

6. A data interface for transferring data between circuits operating in two distinct clock domains under the control of a first and distinct second clock signals where the frequency of the first clock signal is an integer multiple of the frequency of the second clock signal, the data interface comprising:

a driver including a latch having an input port and an output port operable to transfer a signal received at the input port to the output port on an active edge of the second clock signal; and a receiver including a second latch having an input port and an output port operable to transfer a signal received at the input port to the output port on an active edge of the first clock signal, the receiver including a multiplexor, a delay element and a synchronization circuit, the multiplexor including an input coupled to the output port of the latch in the driver, an output coupled to the input port of the second latch and an enable port for enabling the transfer of the data through the multiplexor, the delay circuit triggered by the active edge of the second clock signal and operable to produce a delay signal active a predetermined time after the second clock signal is active, the synchronization circuit operable to receive the delay signal and generate an enable signal that is coupled to the enable port of the multiplexor; and means for coupling the output port of the latch to the input port of the second latch, whereby data metastable failures are minimized in transferring signals through the data interface.

7. A method of transferring data from a first circuit driven by a first clock signal to a second circuit driven by a second clock signal, the first clock signal and second clock signal each being distinct and independent and having different frequencies, the method comprising:

outputting a data signal from the first circuit;

receiving the data signal at a synchronization circuit; and transferring the data signal from the synchronization circuit to the second circuit after a predetermined delay based on at least the second clock signal.

8. The method according to claim 7, wherein the step of transferring includes the substeps of:

receiving an enable signal at the synchronization circuit;

delaying the propagation of the enable signal through the synchronization circuit by a predetermined amount;

transferring the data signal from the synchronization circuit to the second circuit on an active edge of the second clock signal following the propagation of the enable signal through the synchronization circuit.

9. The method of claim 7 further comprising receiving the data signal at the second circuit.

10. A method of synchronizing the transfer of data from a first circuit operating on a first clock signal to a second circuit operating on a second clock signal, the first clock signal and the second clock signal having different frequencies, comprising:

receiving at a synchronization circuit a data signal from the first circuit;

receiving an enable signal at the synchronization circuit;

delaying the propagation of the enable signal through the synchronization circuit by a predetermined amount;

transferring the data signal from the synchronization circuit to the second circuit after the enable signal has propagated through the synchronization circuit.

11. The method of claim 10 wherein the step of transferring the data signal includes transferring the data signal on an active edge of the second clock signal that arrives after the enable signal has propagated through the synchronization circuit.

12. The method of claim 10 further comprising recieving the data signal at the first circuit;

transferring the data signal from the first circuit to the synchronization circuit at an active edge of the first clock signal.

13. The method of claim 1 further comprising triggering the transfer of the enable signal to the synchronization circuit on the active edge of the first clock signal.

14. A circuit for synchronizing the transfer of data from a first circuit driven by a first clock signal to a second circuit driven by a second clock signal, the first clock signal and the second clock signal having different frequencies, comprising:

a multiplexor for selecting one of at least two data inputs to be output based on a select signal, a first data input of the multiplexor receiving a data signal from the first circuit;

a first latch operable to transfer an enable signal received at an input port to the output port on an active edge of the first clock signal;

a delay circuit operable to transfer the enable signal received from the first latch to an output port after a predetermined delay;

a second latch operable to transfer the enable signal received from the delay circuit to an output port on an active edge of the second clock signal;

a divider circuit for generating an output signal having a frequency related to the second clock signal frequency when the divider circuit receives the enable signal output from the second latch;

wherein the multiplexor uses the output signal of the divider circuit as the select signal.

15. The circuit according to claim 14, wherein the frequency of the second clock signal is an integer multiple of the frequency of the first clock signal.

16. The circuit according to claim 15, wherein the frequency of the output signal of the divider circuit is half the frequency of the second clock signal.

17. The method of claim 7 wherein the transferring step includes transferring the data signal from the synchronization circuit to the second circuit after the predetermined delay based on the first clock signal.

* * * * *